(12) United States Patent
Hethcote

(10) Patent No.: US 10,464,626 B2
(45) Date of Patent: Nov. 5, 2019

(54) MAP AND MAP HOLDER SYSTEM AND METHOD

(71) Applicant: Raven's Trail LLC, Seattle, WA (US)

(72) Inventor: Kevin Hethcote, Seattle, WA (US)

(73) Assignee: RAVEN'S TRAIL LLC, Seattle, WA (US)

( * ) Notice: Subject to any disclaimer, the term of this patent is extended or adjusted under 35 U.S.C. 154(b) by 0 days.

(21) Appl. No.: 16/012,533

(22) Filed: Jun. 19, 2018

(65) Prior Publication Data

US 2018/0339741 A1   Nov. 29, 2018

Related U.S. Application Data

(63) Continuation-in-part of application No. 29/605,177, filed on May 24, 2017, now Pat. No. Des. 850,329.

(60) Provisional application No. 62/526,886, filed on Jun. 29, 2017.

(51) Int. Cl.
*B62J 11/00* (2006.01)
*B62K 21/12* (2006.01)

(52) U.S. Cl.
CPC ............... *B62J 11/00* (2013.01); *B62K 21/12* (2013.01)

(58) Field of Classification Search
CPC ............. B62J 11/00; B62K 21/12; F16B 2/08
USPC ........................................................ 224/420
See application file for complete search history.

(56) References Cited

U.S. PATENT DOCUMENTS

| | | | |
|---|---|---|---|
| 1,759,544 A * | 5/1930 | Croes | G09B 29/04 283/34 |
| 1,834,260 A * | 12/1931 | Thompson | G09B 29/10 224/276 |
| 4,800,664 A * | 1/1989 | Marstall | B62J 11/00 224/413 |
| 4,828,151 A | 5/1989 | Goss | |
| 5,044,588 A * | 9/1991 | Gunter | B62J 11/00 224/425 |
| 5,106,001 A | 4/1992 | Figinski | |
| 5,114,060 A * | 5/1992 | Boyer | B62J 7/06 224/413 |
| D352,257 S * | 11/1994 | Poline | D12/114 |
| 5,579,969 A | 12/1996 | Brandell | |
| D436,898 S | 1/2001 | Okada | |
| 6,763,625 B2 * | 7/2004 | Durham | G09F 3/14 280/304.3 |
| D496,223 S | 9/2004 | Clarichetti | |
| D528,366 S | 9/2006 | Medard | |
| D580,302 S | 11/2008 | Jordan, III | |
| D589,300 S | 3/2009 | Altiner et al. | |
| D628,950 S | 12/2010 | Hsiao | |
| D662,505 S | 6/2012 | Mori | |
| D687,742 S | 8/2013 | Lin | |

(Continued)

OTHER PUBLICATIONS

Mapdec Cycle Works, "Mapdec-Rotating Map Board," Mapdec.com, https://mapdec.com/products/mapdec-map-board, Dec. 8, 2011 (retrieved Nov. 29, 2018), 3 pages.

(Continued)

*Primary Examiner* — Peter N Helvey
(74) *Attorney, Agent, or Firm* — Davis Wright Tremaine LLP

(57) ABSTRACT

A map holder system comprising a planar top plate having a plate face surrounded by a rim with one or more tabs disposed about the rim; a coupling plate rotatably coupled with the top plate, the coupling plate comprising a coupling architecture; and a mounting bracket removably coupled with the coupling plate via one or more coupling heads that are configured to engage with and removably couple with the coupling architecture of the coupling plate.

13 Claims, 15 Drawing Sheets

(56) References Cited

U.S. PATENT DOCUMENTS

| | | | |
|---|---|---|---|
| D695,207 | S | 12/2013 | Dams |
| D704,199 | S | 5/2014 | Byun |
| D735,210 | S | 7/2015 | Kim et al. |
| D748,639 | S | 2/2016 | Khodapanah et al. |
| D780,667 | S | 3/2017 | Kim |
| D781,773 | S | 3/2017 | Kim |
| D782,346 | S | 3/2017 | Moses |
| D784,907 | S | 4/2017 | Lu |
| D790,435 | S | 6/2017 | Du |
| D805,520 | S | 12/2017 | Mussard |
| D832,276 | S | 10/2018 | Miles |
| 2006/0208023 | A1 | 9/2006 | Manning |
| 2007/0205238 | A1 | 9/2007 | Gustavsson |
| 2010/0001151 | A1 | 1/2010 | Wheatley et al. |
| 2018/0339741 | A1 | 11/2018 | Hethcote |

OTHER PUBLICATIONS

Miry, "Miry Bike Pro 11WR-25.4 Mapholders," Miry.cz, http://www.miry.cz/index.php?lang=en&view=produkty#bike, Jan. 1, 2004 (retrieved Nov. 29, 2018), 1 page.

Nordenmark Adventure, "Map Holder for Mountain Bike Orienteering: MTB Classic," Nordenmark.com, http://ny.nordenmark.com/wp-content/uploads/2014/10/MTB-O-classic.pdf, Oct., 2014 (retrieved Nov. 29, 2018), 1 page.

Nordenmark Adventure, "Map Holder for Mountain Bike Orienteering: MTB Extreme," Nordenmark.com, http://ny.nordenmark.com/wp-content/uploads/2014/10/MTB-O-extreme.pdf, Oct. 2014 (retrieved Nov. 29, 2018), 1 page.

Nordenmark Adventure, "Map Holder for Mountain Bike Orienteering: MTB Light," Nordenmark.com, http://ny.nordenmark.com/wp-content/uploads/2014/10/MTB-O-light.pdf, Oct. 2014 (retrieved Nov. 29, 2018), 1 page.

Rixen & Kaul, "Skyride Rotating Mini Map Holder With Am803 Adapter for Bicycle," Amazon.com, https://www.amazon.com/Rixen-Kaul-Skyride-Rotating-Adapter/dp/B0010AIAEM/ref=sr_1_1?ie=UTF8&qid=1543531763&sr=8-1&keywords=Rixen+%26+Kaul+Skyride+Rotating+Mini+Map+Holder+With+Am803+Adapter+For+Bicycle, Oct. 24, 2016 (retrieved Nov. 29, 2018), 1 page.

Wildfire Sports & Trek, "Autopilot PilotOne Mapboard and Base," Wildfiresports.com.au, https://www.wildfiresports.com.au/autopilot-pilotone-carbon-reinforced-mapboard-and, Jan. 1, 2010 (retrieved Nov. 29, 2018), 5 pages.

* cited by examiner

MAP AND MAP HOLDER SYSTEM AND METHOD

CROSS-REFERENCE TO RELATED APPLICATIONS

This application is a non-provisional of and claims the benefit of U.S. Provisional Application No. 62/526,886, filed Jun. 29, 2017, which application is hereby incorporated herein by reference in its entirety and for all purposes.

This application is also a continuation-in-part of and claims priority to U.S. Design application Ser. No. 29/605,177 filed May 24, 2017, which application is hereby incorporated herein by reference in its entirety and for all purposes.

Figure 1:
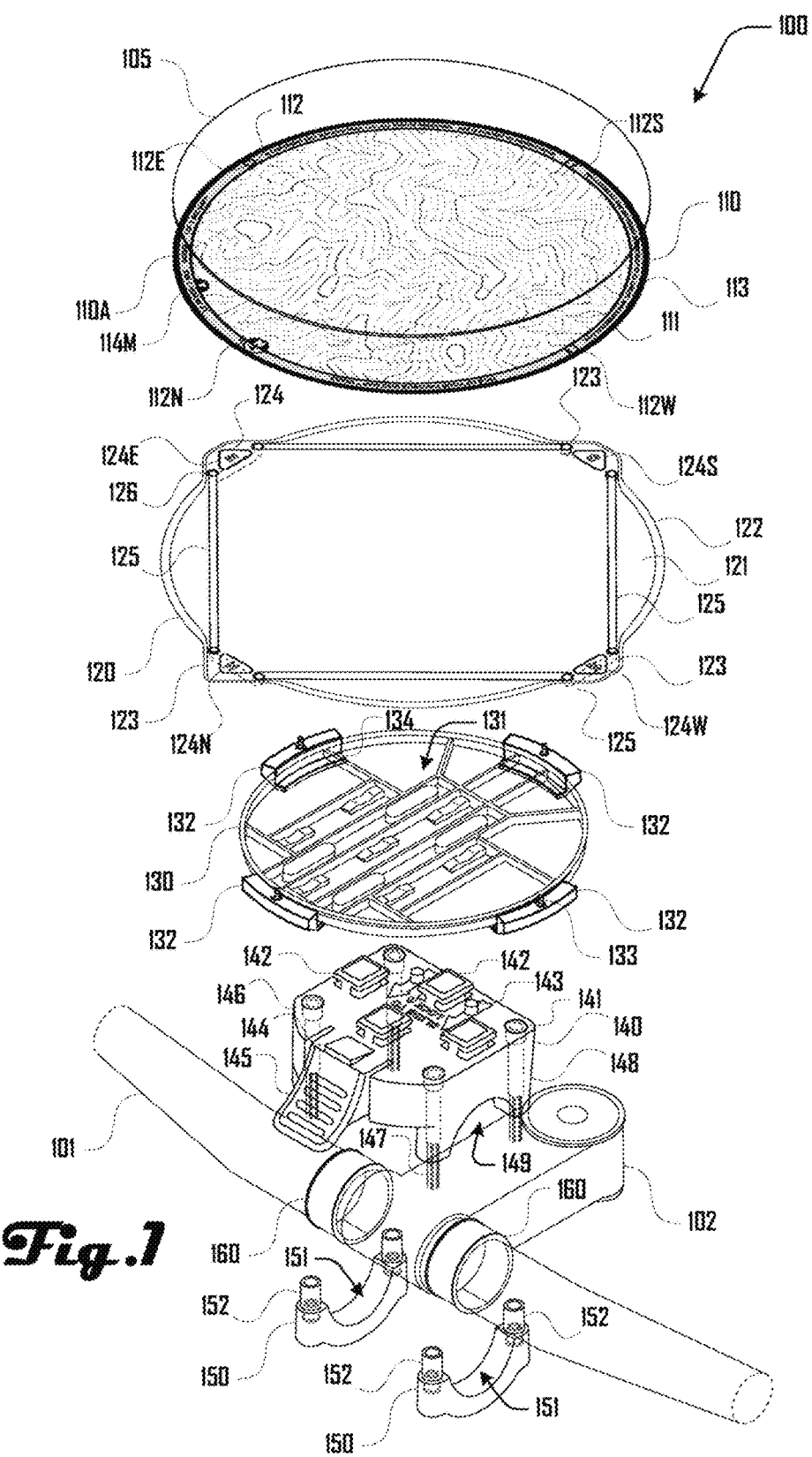
FIG. 1 illustrates an exploded view of an example map holder system having a top plate, a coupling plate and a mounting bracket.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure relates to the generation of maps and map holder systems and methods. Turning to FIG. 1, an exploded view of an example map holder system 100 is illustrated, which comprises a circular and transparent map cover 105, which can be configured to reside over a circular map 110A. The map 110 in this example is shown comprising a map portion 111 and a plurality of cardinal direction indicators 112 including north, south, east and west cardinal direction indicators 112N, 112S, 112E, 112W, a magnetic north declination 114M and a circumference band 113 that surrounds the periphery of the circular map 110A.

As discussed in more detail herein, the map cover 105 and map 110 can be configured to couple with a planar top plate 120, which comprises a plate face 121 that is surrounded by a rim 122 with a plurality of tabs 123. As shown in this example, the tabs 123 can comprise cardinal direction indicators 124, including north, south, east and west cardinal direction indicators 124N, 124S, 124E, 124W. Additionally, one or more cords 125 can extend between the tabs 123 and through holes 126 proximate to the tabs 123. For example, as shown in the example of FIG. 1, a single contiguous cord 125 can extend between the tabs 123 and through the holes 126 such that the cord 125 extends below the tabs 123 as shown by dashed lines.

The top plate 120 can be configured to rotatably couple with a coupling plate 130, which can comprise a coupling architecture 131, which is described in more detail herein. The coupling plate 130 can be configured to removably couple with a mounting bracket 140, which is configured to removably couple with the handle bars 101 of a bicycle 102 as shown in the example of FIG. 1. In various examples, the coupling plate 130 can be rotatably coupled with the top plate 120 via one or more clips 132 that can be secured to the top plate 120 via one or more coupler 133 (e.g., a bolt, screw, pin, or the like). The clips 132 can be desirable for keeping the top plate 120 and coupling plate 130 rotatably coupled and to prevent separation of the top plate 120 and coupling plate 130 during use. As shown in the see-through example of FIG. 1, the clips 132 can abut and outside edge of the coupling plate 130 and can include a rim 134 that extends over the face of the coupling plate 130 to generate a rotatable coupling between the top plate 120 and coupling plate 130.

The mounting bracket 140 comprises a coupling face 141 that includes a plurality of coupling heads 142 and alignment pins 143, which are configured to engage with and couple with the coupling architecture 131 of the coupling plate 130 as described in more detail herein. The coupling face 141 also includes a locking tab 144 that can be movably actuated by a release lever 145 that extends from the coupling face 141.

A plurality of screw ports 146 can be defined by the mounting bracket 140, which can allow a respective plurality of coupling screws 147 to extend from the coupling face 141 within sidewalls 148 of the mounting bracket 140. The sidewalls 148 can further define slots 149 that are configured to engage the handlebars 101 of the bicycle 102, including engaging a pair of mounting gaskets 160. A pair of mounting arms 150 that define slots 151 can also be configured to engage the handlebars 101 of the bicycle 102, including engaging the pair of mounting gaskets 160. The mounting arms 150 can couple with the mounting bracket 140 via the coupling screws 147, with the coupling screws 147 respectively coupling with ports 152 at ends of mounting arms 150 (e.g., via threads of the ports 152, or the like). Accordingly, the mounting bracket 140 and mounting arms 150 can surround and engage the handlebars 101 and mounting gaskets 160 to couple the map holder system 100 to the handlebars of the bicycle 102. In some embodiments, the map holder system 100 can include one or more pairs of mounting gaskets 160 of different thicknesses which can be desirable in some examples to accommodate different sizes of handlebars (e.g., 35 mm diameter; 31.8 mm diameter; 25.4 mm diameter, or the like).

The map cover 105 can be rigid or flexible and can comprise any suitable material in various embodiments, including a plastic, glass, or the like. Also, while an example of a round and planar map cover 105 is shown in FIG. 1, in further embodiments, the map cover can be any suitable size or shape. In further embodiments, the map cover 105 can be absent from the map holder system 100.

The map 110 can be rigid or flexible and can comprise any suitable material in various embodiments, including paper, plastic, metal, fabric, or the like. In some examples, the map can comprise plastic-laminated paper. Additionally, while some preferred embodiments, include a circular map 110A as shown in FIG. 1, further embodiments can include maps 110 of various suitable sizes, shapes and configurations, including a square map 110B (see, e.g., FIG. 10*a*), a rectangular map (see, e.g., FIG. 10*b*), or the like.

The map portion 111 can depict various types of maps, including a physical map, a topographical map, a road map, an abstract functional map, or the like. Additionally, the map 110 can comprise various suitable types of images, text or other information, including a ledged, key, written description, written directions, or the like. Additionally, in further embodiments, the map 110 can comprise various suitable types of devices or displays, including a smartphone, tablet computer, or the like, which may or may not have a circular display.

Figure 3:
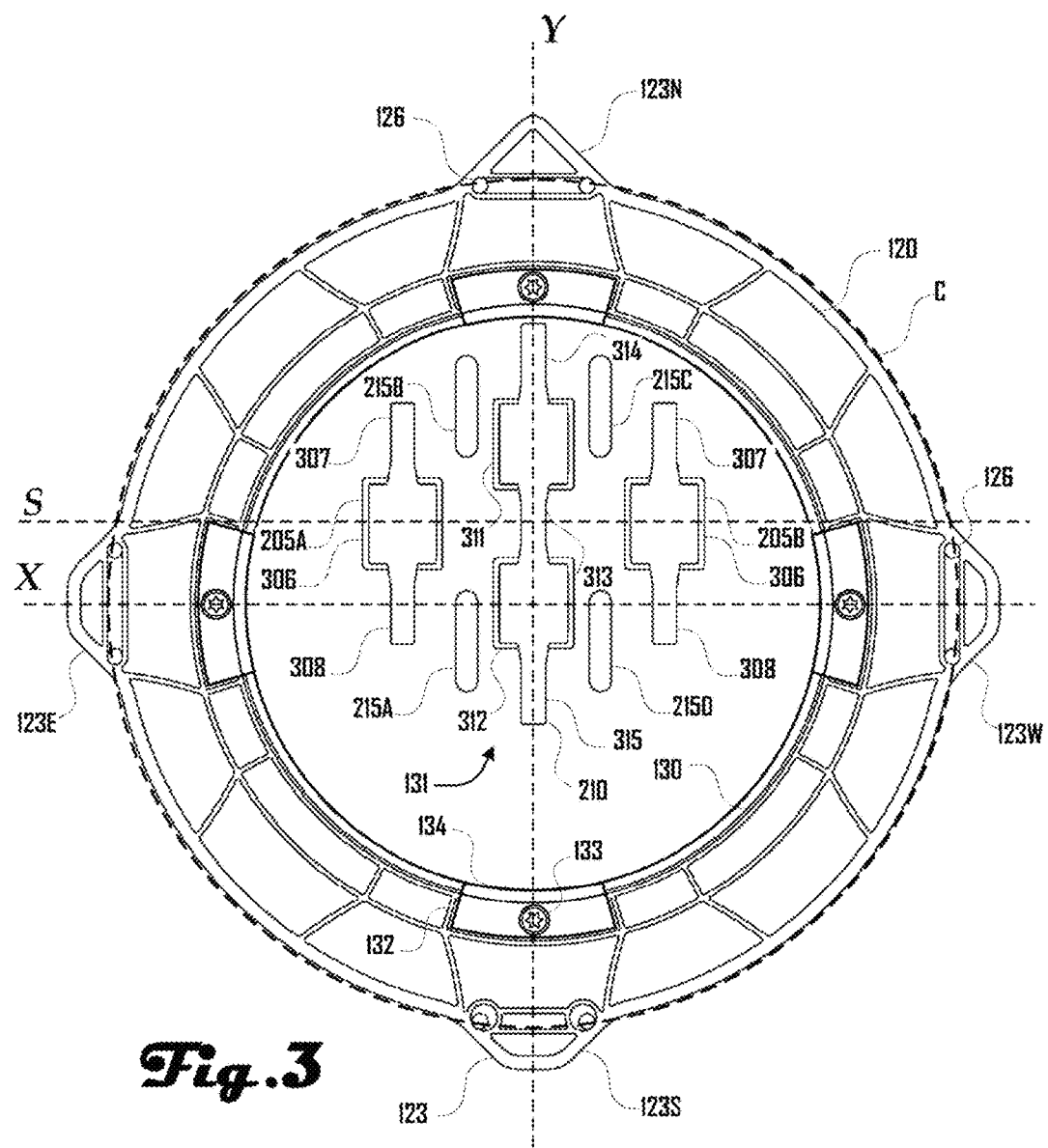
FIG. 3 illustrates the underside of the top plate with the coupling plate rotatably coupled to the top plate.

As illustrated herein, the top plate 120 can comprise a circular plate face 121 with tabs 123 extending from plate face 121 that indicate cardinal directions, including north, south, east and west. For example, as shown in FIG. 3, (which illustrates the underside of the top plate 120 with the coupling plate 130 rotatably coupled to the top plate 120), the tabs 123 can be aligned along diameter axes X and Y and extend past a circumference edge C defined by the plate face 121 and/or rim 122. As shown in the example of FIG. 3, the north and south tabs 123N, 123S are aligned along diameter axis Y and east and west tabs 123E, 123W are aligned along diameter axis X, that is perpendicular to diameter axis Y. Additionally, as shown in this example, the north tab 123N can comprise a different shape than the south, east and west tabs 123S, 123E, 123W. This can be desirable to physically distinguish the north tab 123N from the south, east and west tabs 123S, 123E, 123W.

While the examples herein illustrate a top plate 120 having four tabs 123 associated with the cardinal directions north, south, east and west, in further embodiments, the top plate 120 can comprise any suitable number of tabs 123, which may or may not be associated with cardinal directions. For example, in one embodiment, the top plate 120 can comprise a single tab 123 associated with the cardinal direction north. In another embodiment, the top plate 120 can comprise eight tabs 123 associated with the cardinal directions of north, north-west, west, south-west, south, south-east, east, and north-east. Additionally, in some embodiments, the top plate 120 can comprise one or more tabs 123 associated with magnetic north and such a tab 123 may or may not be movable. In a further embodiment, tabs 123 can be absent.

As discussed above, one or more cords 125 can extend between the tabs 123 and through holes 126 proximate to the tabs 123. For example, as shown in FIG. 1, a single contiguous cord 125 can extend between the tabs 123 and through the holes 126 such that the cord 125 extends below the tabs 123 as shown by dashed lines. However, in further embodiments, there can be any suitable number of separate cords 125. Also, while the examples herein illustrate the top plate 120 having four portions of chord 125 that extend along the plate face 121, further embodiments can include any suitable plurality of portions of chord 125 that extend along the plate face 121 in various suitable configurations, including one, two, three, four, five, six, seven, eight, and the like.

Additionally, examples herein (e.g., FIGS. 1 and 3) illustrate that the holes 126 are positioned proximate to the tabs 123 and coincident with the circumference edge C defined by the plate face 121 and/or rim 122. However, in further embodiments, such holes can be positioned in various other suitable locations in further embodiments. Additionally, other suitable structures such as slots, clips, or the like can be used to direct, hold or constrain cords 125 in various suitable ways and therefore the example holes 126 should not be construed to be limiting.

The cords 125 can comprise various suitable materials of any suitable elasticity, flexibility or rigidity. For example, in some preferred embodiments, the cords 125 can comprise elastic shock cords, or the like.

The cords can be configured to hold maps 110 and/or map covers 105 of various sizes and shapes in accordance with some embodiments as described in more detail herein (e.g., as shown in FIGS. 8*a*, 8*b*, 9*a*, 9*b*, 10*a* and 10*b*). However, in further embodiments, maps 110 and/or map covers 105 can be held in other suitable ways, and a holding structure that includes cords 125 should not be construed to be limiting on the variety of suitable alternative holding structures that are within the scope and spirit of the present disclosure.

The coupling plate 130 can be configured to rotatably reside within a slot on the bottom of the top plate 120. For example, as shown in FIG. 3, the coupling plate 130 can be centrally located within the body of the top plate 120 such that a circumference edge of the coupling plate 130 has a consistent distance from the circumference edge C defined by the plate face 121 and/or rim 122. The coupling architecture 131 of the coupling plate 130 can therefore allow the assembled top plate 120 and coupling plate 130 to couple with structures on the coupling face 141 of the mounting bracket 140.

Figure 2:
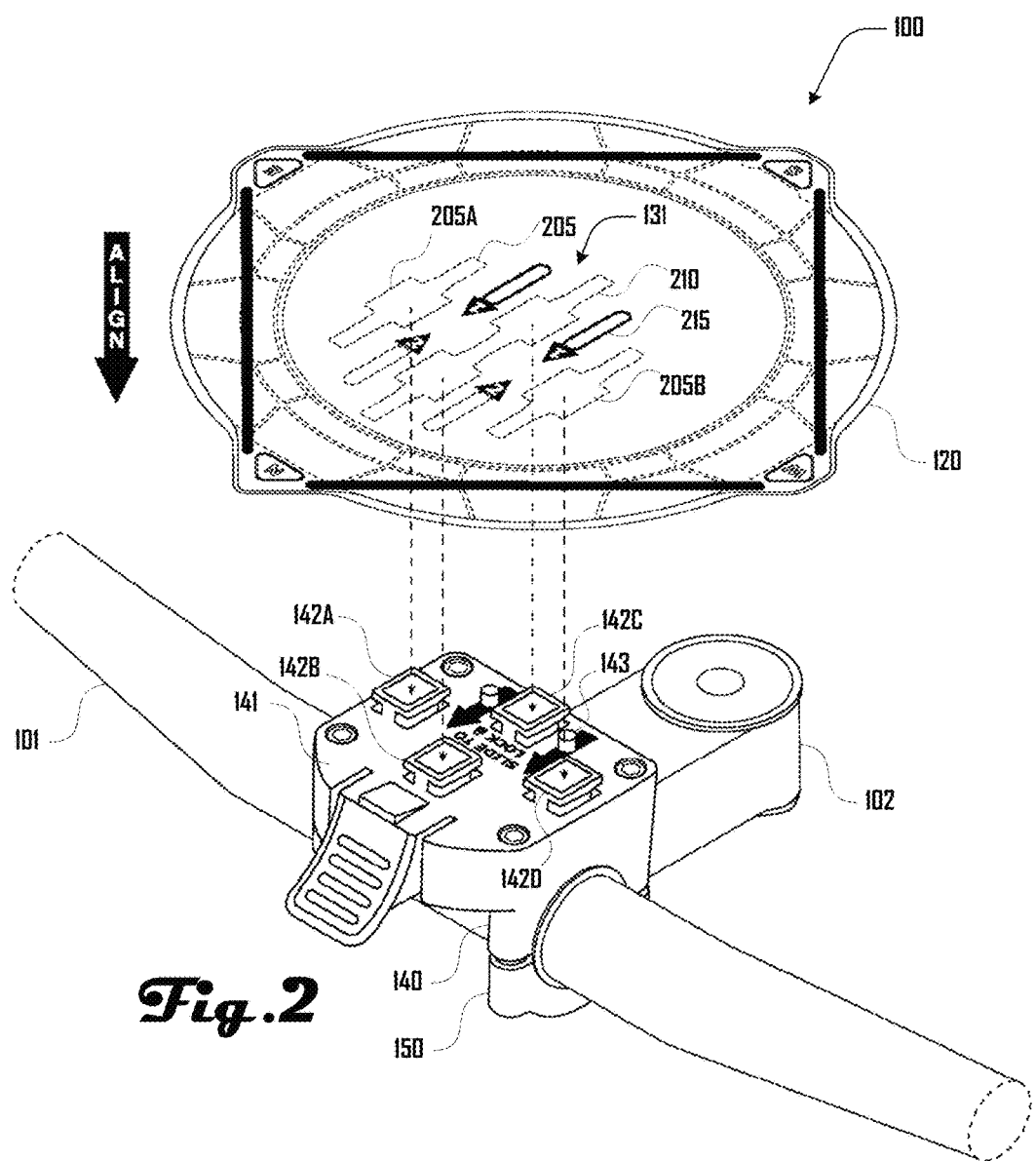
FIG. 2 illustrates a coupling architecture of the coupling plate corresponding to and being aligned with coupling heads of a mounting bracket.

For example, referring to FIGS. 2 and 3, the coupling architecture 131 can comprise a first and second peripheral coupling slot 205A, 205B that respectively correspond to peripheral coupling heads 142A, 142D on the coupling face 141 of the mounting bracket 140. The coupling architecture 131 can also comprise a central coupling slot 210 that corresponds to coupling heads 142B, 142C on the coupling face 141 of the mounting bracket 140. The coupling architecture 131 can further comprise a plurality of alignment slots 215 that correspond to alignment pins 143 on the coupling face 141 of the mounting bracket 140.

As discussed herein, the coupling plate 130 can be rotatably coupled to the top plate 120 with one example rotational configuration of the top plate 120 and coupling plate 130 shown in FIG. 3. In this example, the coupling architecture 131 is shown having axis Y as a first axis of symmetry and having axis S as a second axis of symmetry with axis S being parallel to and spaced apart from axis X. Accordingly, as shown in FIG. 3, the coupling architecture 131 can be centrally offset from the center of the top plate 120 and coupling plate 130 along one axis. As described in more detail herein, such a configuration can be desirable so as to provide a first and second coupling configuration for the top plate 120 and coupling plate 130 on the mounting bracket 140 (e.g., as shown in FIGS. 4b and 12b respectively). Such a first and second coupling configuration can be desirable in various embodiments to provide a different position of the top plate 120 relative to the handle bars 101 of the bicycle 102, with a certain position being desirable over another based on the type of bicycling activity, desired map use, or the like.

For example, some embodiments allow a user to select a position that won't interfere with a user's pedaling knees or impinge upon their rider space immediately behind the handlebars and around the stem of the bicycle 102. In other words, if a bicycle 102 has a short stem then it may be desirable in some embodiments for the user to select the position shown in FIG. 12b, or if they have a longer stem, then selecting the position shown in FIG. 4b could be suitable. Accordingly, in various embodiments, the coupling position of the top plate 120 relative to the handle bars 101 of the bicycle 102 can be selected based on stem length of the bicycle 102 (e.g., a short or long bicycle stem).

As shown in FIG. 3, the peripheral coupling slots 205 can extend parallel to axis Y and can include a central larger-width portion 306 having a larger width compared to a pair of smaller-width end portions 307, 308 extending from the central portion 306. The central coupling slot 210 extends along the Y axis and includes a pair of larger-width portions 311, 312 separated by a central smaller with portion 313 therebetween and smaller-width end portions 314, 315. The alignment slots 215 also extend parallel to the Y axis pairs extending along the same axis between the central coupling slot 210 and a respective peripheral coupling slot 205A, 205B. Specifically, a first and second alignment slot 215A, 215B extend along a common axis that is parallel to the Y axis and between the first peripheral coupling slot 205A and the central coupling slot 210. A second and third alignment slot 215C, 215D extend along a common axis that is parallel to the Y axis and between the second peripheral coupling slot 205B and the central coupling slot 210.

Figure 4A:
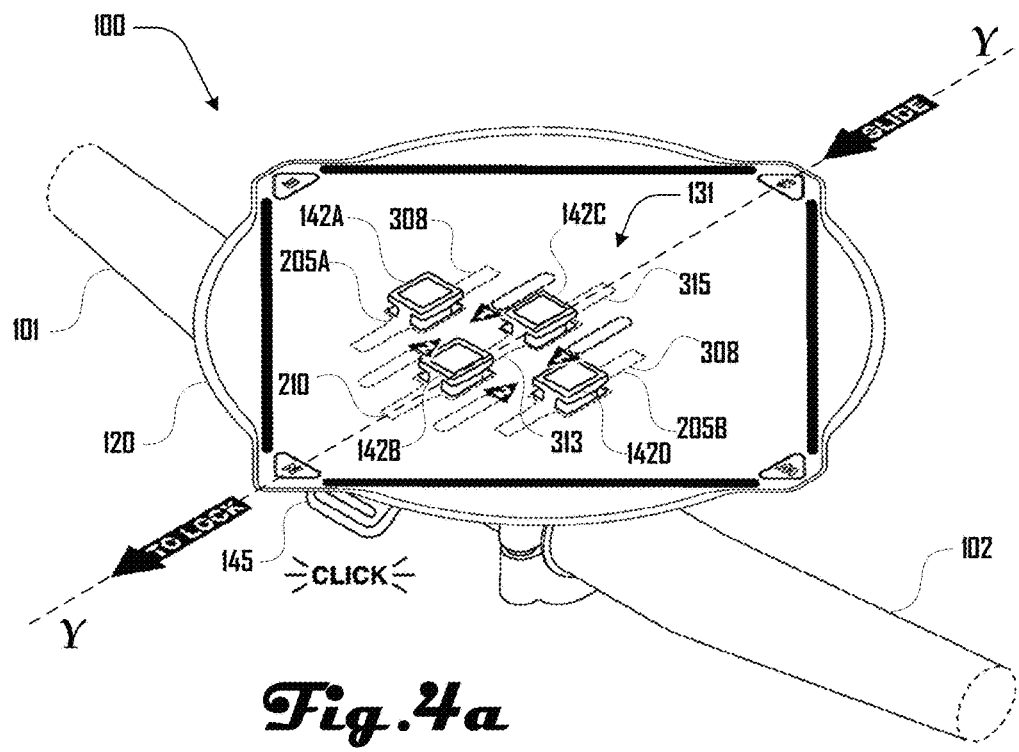
FIG. 4a illustrates the coupling architecture corresponding to and being aligned with the coupling heads such that the coupling plate can be placed over the coupling heads with the coupling heads extending into the respective larger-width portions of the coupling architecture and with a bottom face of the coupling plate engaging the coupling face of the mounting bracket.
Figure 4B:
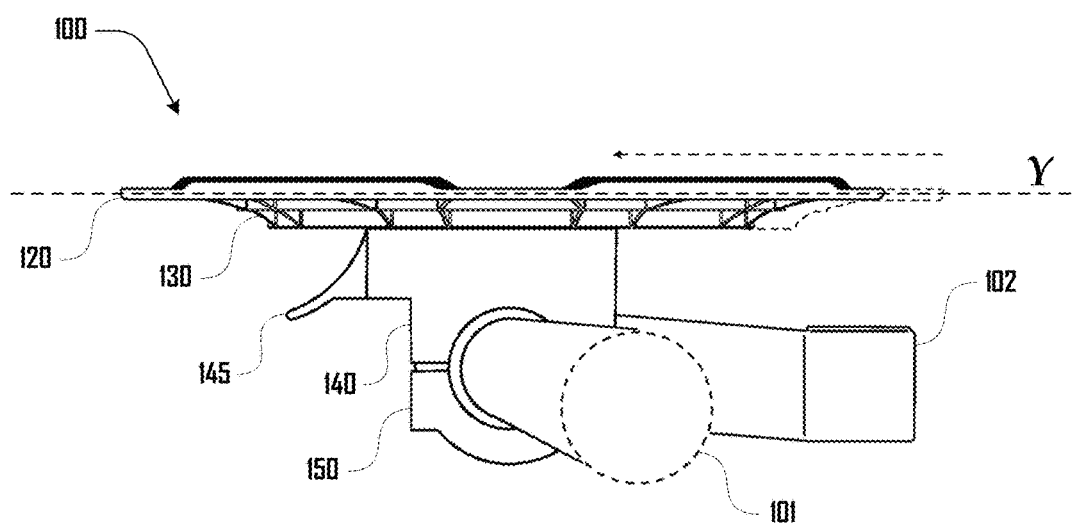
FIG. 4b illustrates coupling plate being slid along an axis from the position illustrated in FIG. 4a to lock the top plate and coupling plate to the mounting bracket.
Figure 5A:
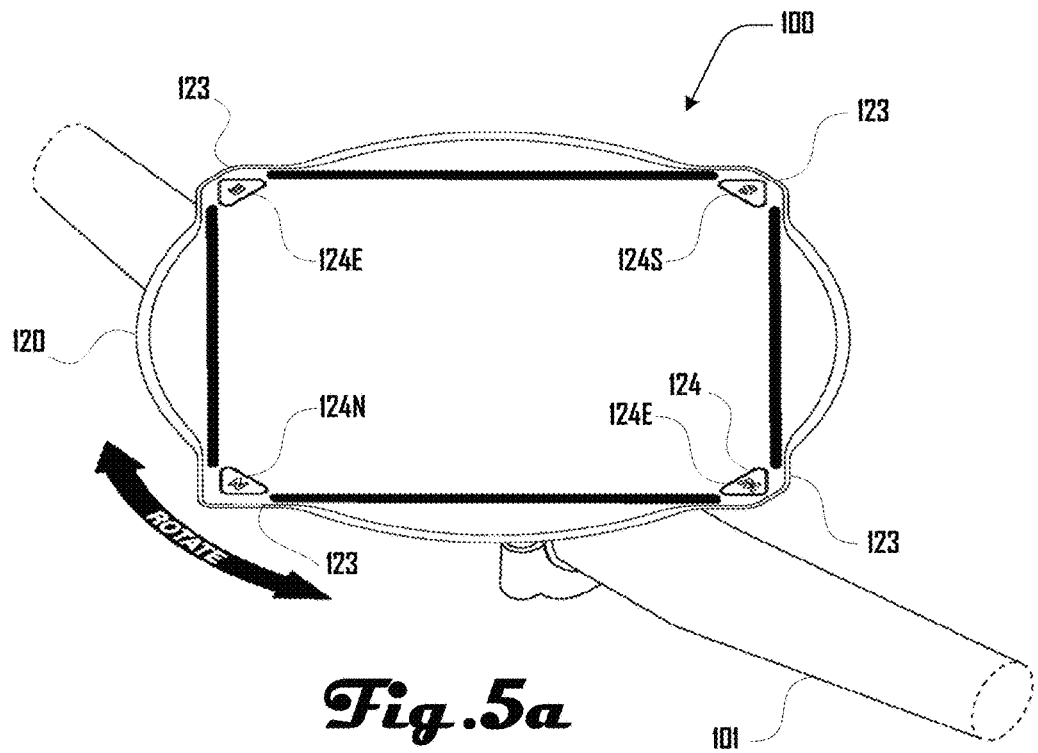
FIGS. 5a and 5b illustrate the top plate being rotatably coupled and rotatably movable relative to the coupling plate, mounting bracket and handlebars of a bicycle.
Figure 5B:
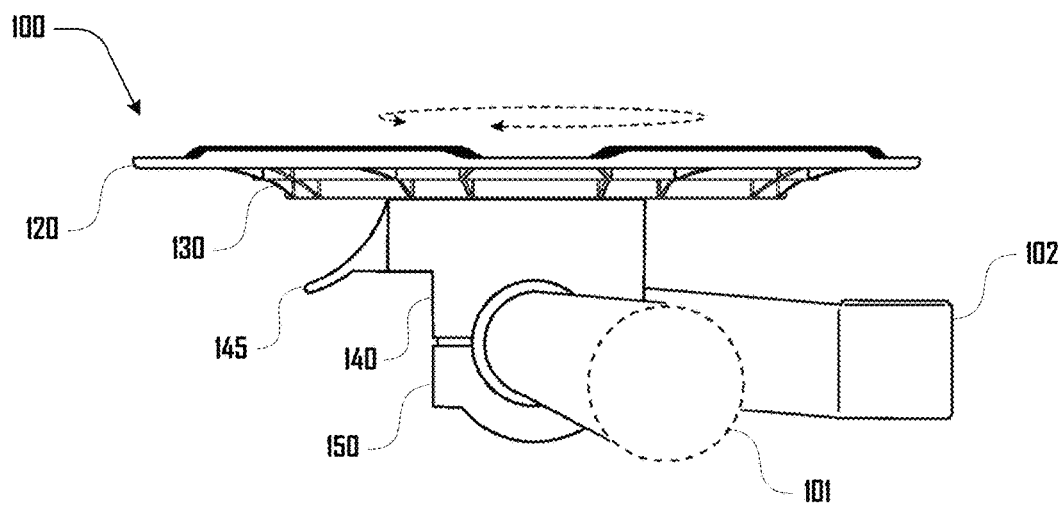

As shown in FIG. 2, the larger-width portions 306, 311, 312 of the coupling architecture 131 correspond to and can be aligned with the coupling heads 142, such that the coupling plate can be placed over the coupling heads 142 with the coupling heads 142 extending into the respective larger-width portions 306, 311, 312 of the coupling architecture 131 and with a bottom face of the coupling plate 130 engaging the coupling face 141 of the mounting bracket 140 as shown in FIG. 4a. Specifically, coupling heads 142A, 142D extend into the larger-width portions 306 of the peripheral coupling slots 205A, 205B and coupling heads 142B, 142C extend into larger width portions 311, 312.

Additionally as shown in the example of FIG. 4a, the alignment pins 143 extend into and engage alignment slots 215A, 215D.

To lock the top plate 120 and coupling plate 130 to the mounting bracket 140, the top plate 120 and coupling plate 130 can be slid along the Y axis from the position illustrated in FIG. 4a to the position illustrated in FIG. 4b. In such a configuration the coupling heads 142 move from the larger-width portions 306, 311, 312 of the coupling architecture 131 to smaller width portions 308, 313, 315, which couples the heads 142 with the coupling architecture 131 based on the T-shaped profile of the heads 142. The alignment pins 143 also translate within the alignment slots 215A, 215D. Additionally, the locking tab 144 engages larger-width portion 311 of the central coupling slot 210 to lock the top plate 120 and coupling plate 130 in place on the mounting bracket 140.

Figure 11:
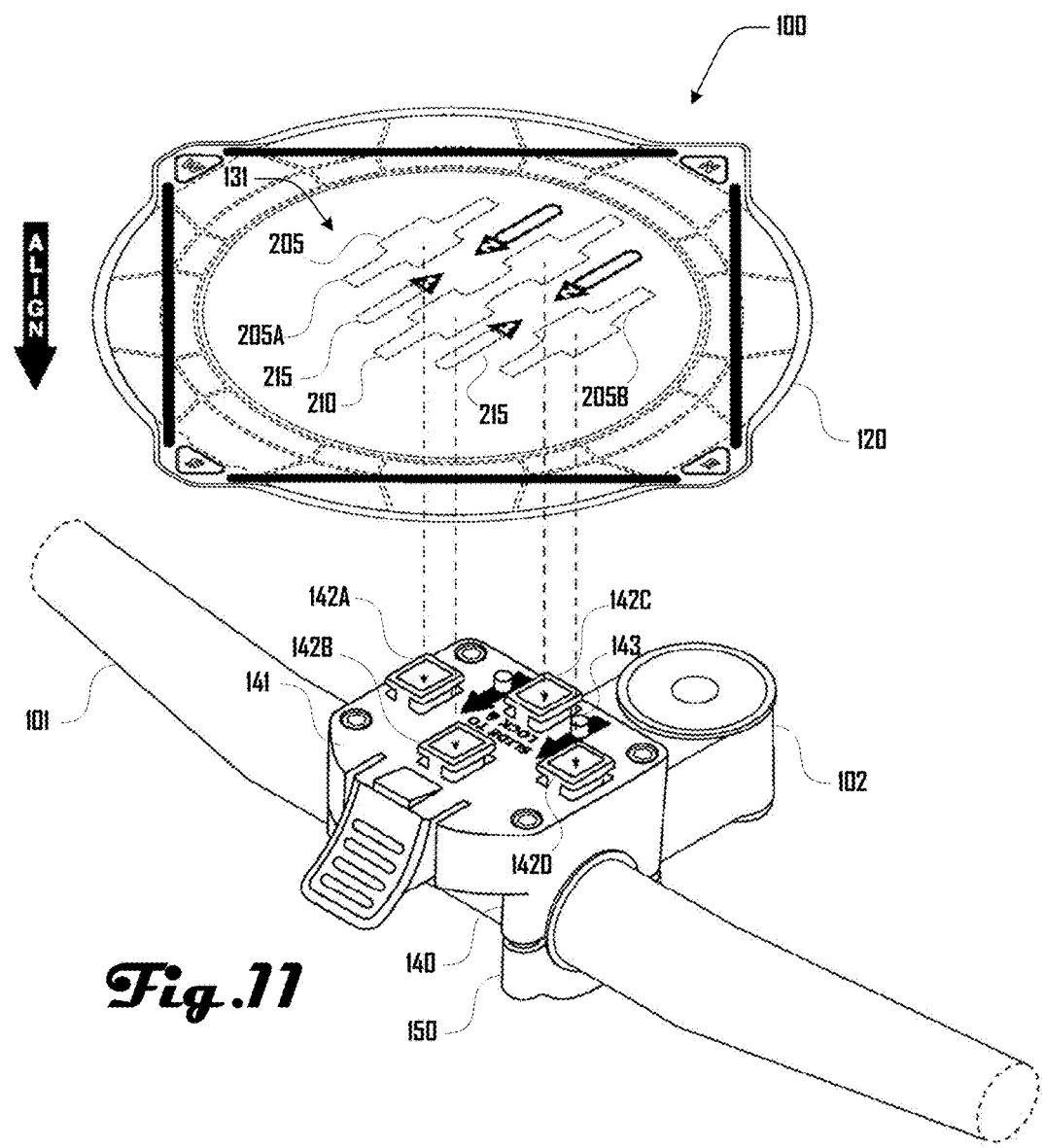
FIGS. 11, 12a and 12b illustrate the top plate and coupling plate rotated 180 degrees compared to the orientation shown in FIGS. 2, 4a and 4b.

FIGS. 2, 4a and 4b illustrate coupling of the top plate 120 and coupling plate 130 in a first orientation on the mounting bracket 140. However, the top plate 120 and coupling plate 130 can also be coupled on the mounting bracket 140 in a second orientation shown in FIGS. 11, 12a and 12b. Specifically, in FIGS. 11, 12a and 12b, the top plate 120 and coupling plate 130 are shown rotated 180 degrees compared to the orientation shown in FIGS. 2, 4a and 4b.

Accordingly, given the coupling architecture 131 being disposed centrally offset from the center of the top plate 120 and coupling plate 130 along one axis and being symmetric along the X axis as shown in FIG. 3, the top plate 120 can assume first and second positions relative to the mounting bracket 140 and handlebars as respectively illustrated in FIGS. 4b and 12b.

Figure 12A:
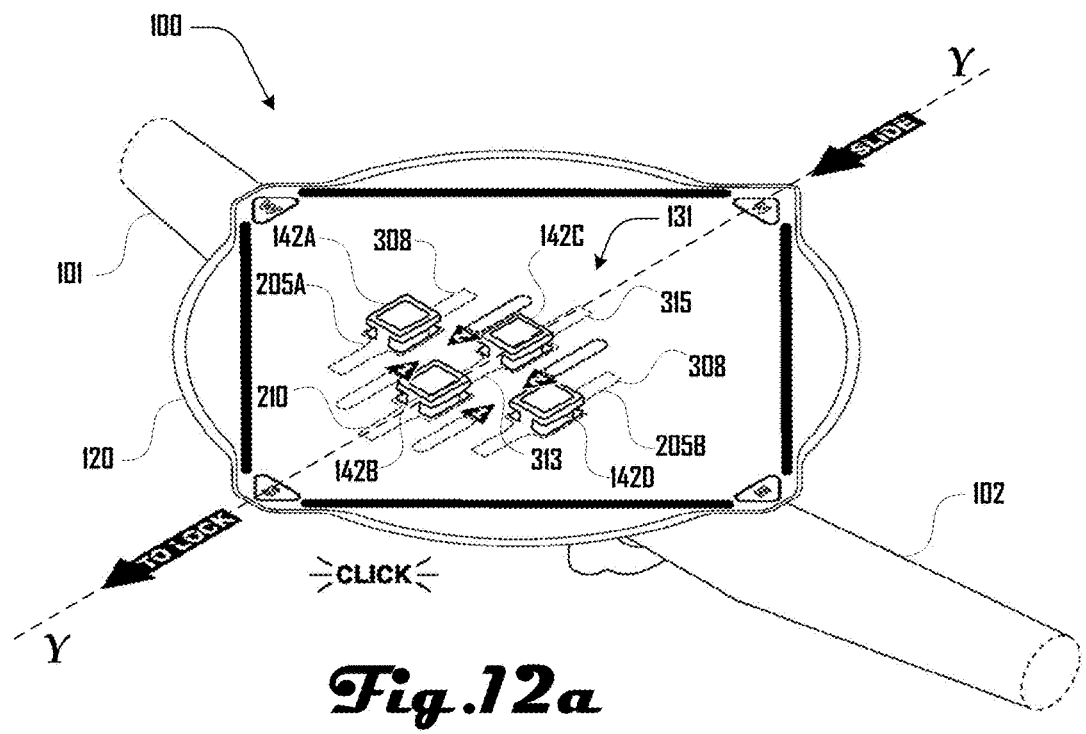
Figure 12B:
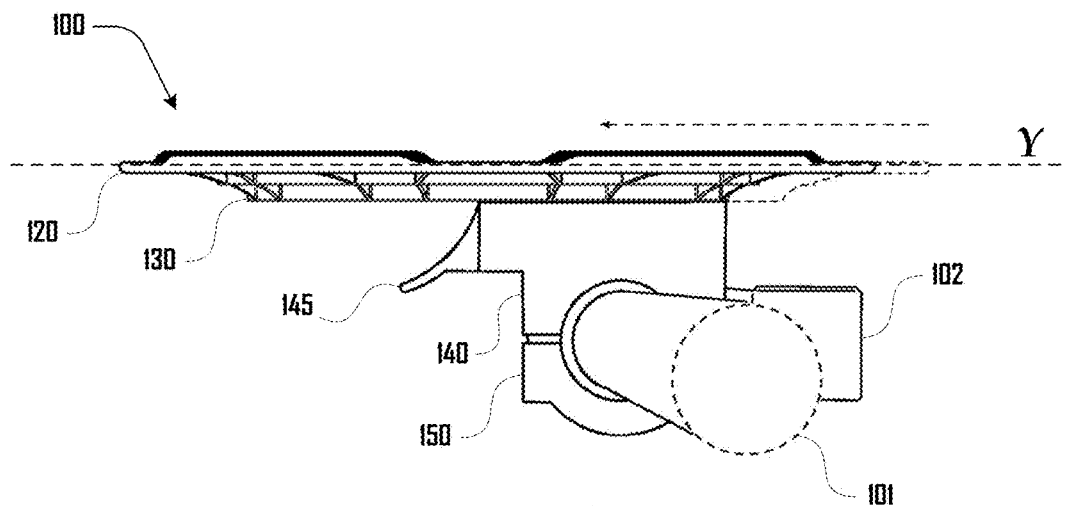

Accordingly, in contrast to sliding the top plate 120 and coupling plate 130 along with Y axis as shown in FIG. 4a to lock the top plate 120 and coupling plate 130 in the position shown in FIG. 4b, FIG. 12a illustrates sliding the top plate 120 and coupling plate 130 in the same direction as in FIG. 4a, but into opposite portions of the coupling architecture 131.

For example, referring to FIGS. 12a and 12b, in such a configuration the coupling heads 142 move from the larger-width portions 306, 311, 312 of the coupling architecture 131 to smaller width portions 307, 313, 314, which couples the heads 142 with the coupling architecture 131 based on the T-shaped profile of the heads 142. The alignment pins 143 also translate within the alignment slots 215B, 215C. Additionally, the locking tab 144 engages larger-width portion 312 of the central coupling slot 210 to lock the top plate 120 and coupling plate 130 in place on the mounting bracket 140.

With the top plate 120 and coupling plate 130 coupled to the mounting bracket 140, the top plate 120 can be rotated about the coupling plate 130, with the coupling plate 130 remaining fixed relative to the mounting bracket 140. For example, with the top plate 120 and coupling plate 130 in the position shown in FIGS. 4a and 4b, FIGS. 5a and 5b then illustrate the top plate 120 being rotatably coupled and rotatably movable relative to the coupling plate 130, mounting bracket 140 and handlebars 101. As discussed in more details herein, rotation of the top plate 120 can be desirable to allow the orientation of a map 110 coupled on the top plate 120 to be changed to match the heading of a rider of the bicycle 102 so that navigation using the map 110 is more intuitive and relative to forward movement of the bicycle 102.

Unlocking and detaching the top plate 120 and coupling plate 130 from the mounting bracket 140 can be performed in a manner generally reversing the steps of coupling the top plate 120 and coupling plate 130 from the mounting bracket 140. For example, referring to the example orientation of FIGS. 2, 4*a* and 4*b*, unlocking and removing the top plate 120 and coupling plate 130 from the mounting bracket 140 in such an orientation is shown in FIGS. 6*a*, 6*b* and 6*c*.

Figure 6A:
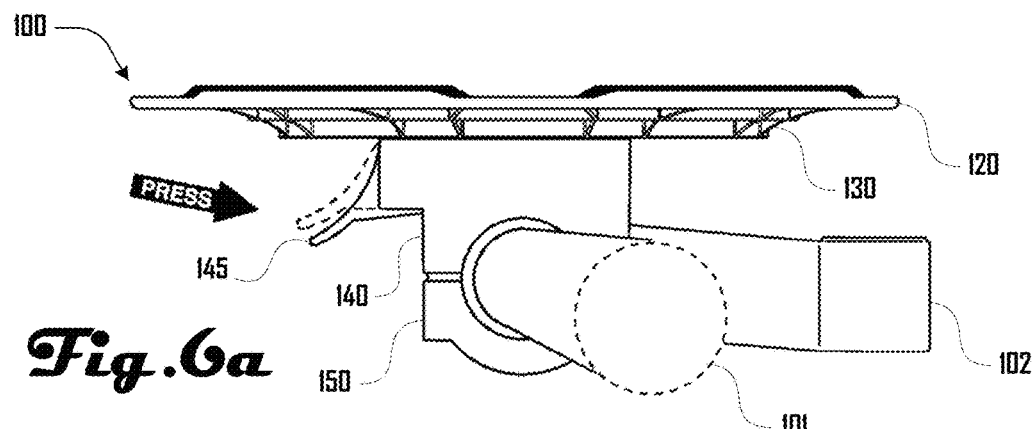
FIG. 6a illustrates actuating a release lever, which allows the coupling plate to slide relative to the mounting bracket.
Figure 6B:
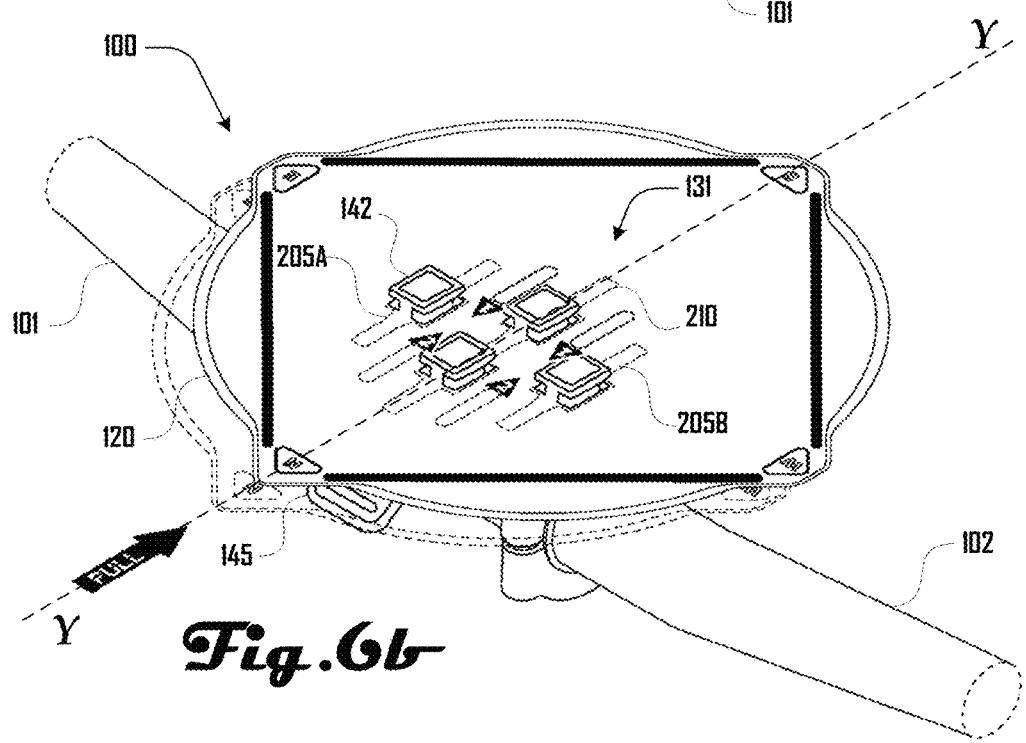
FIG. 6b illustrates the coupling plate being slid so that the coupling heads move to larger-width portions of the coupling architecture.
Figure 6C:
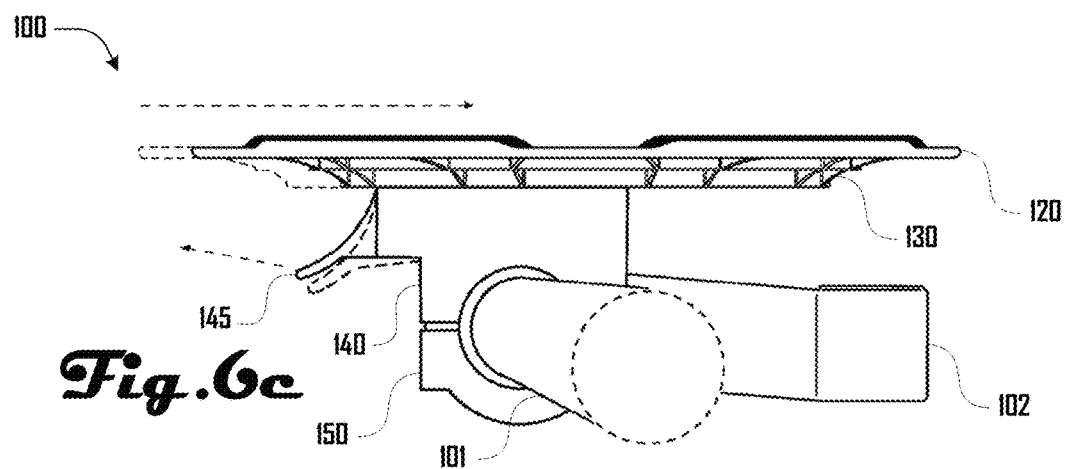
FIG. 6c illustrates the release lever returning to a non-actuated position.

The coupling plate 130 can be unlocked as shown in FIG. 6*a* by actuating the release lever 145, which disengages the locking tab 144 from the larger-width portion 312 of the central coupling slot 210 and allows the coupling plate 130 to slide relative to the mounting bracket 140. From an initial configuration shown in FIG. 6*a*, with the coupling heads 142 starting within the smaller width portions 308, 313, 315, which couples the heads 142 with the coupling architecture 131, the top plate 120 and coupling plate 130 can be slid in the opposite direction along the Y axis compared to sliding shown in FIG. 4 so that the coupling heads 142 move to the larger-width portions 306, 311, 312 of the coupling architecture 131 as shown in FIG. 6*b*, with the change in position shown in FIG. 6*c* including the release lever 145 returning to a non-actuated position.

As shown in this example embodiment, the release lever 145 can be biased via a living hinge defined by the material of the mounting bracket 140. However, in further embodiments, the release lever 145 and locking tab 144 can be configured in various suitable ways and be configured to lock and unlock the coupling plate 130 in various suitable ways. Accordingly, the example configuration of a locking mechanism including the release lever 145 and locking tab 144 that can engage with one of the larger-width portions 311, 312, depending on orientation, should not be construed to be limiting on the wide variety of alternative mechanisms or configurations that are within the scope and spirit of the present disclosure. Additionally, in some embodiments, elements such as the release lever 145 and/or locking tab 144 can be absent.

Figure 7A:
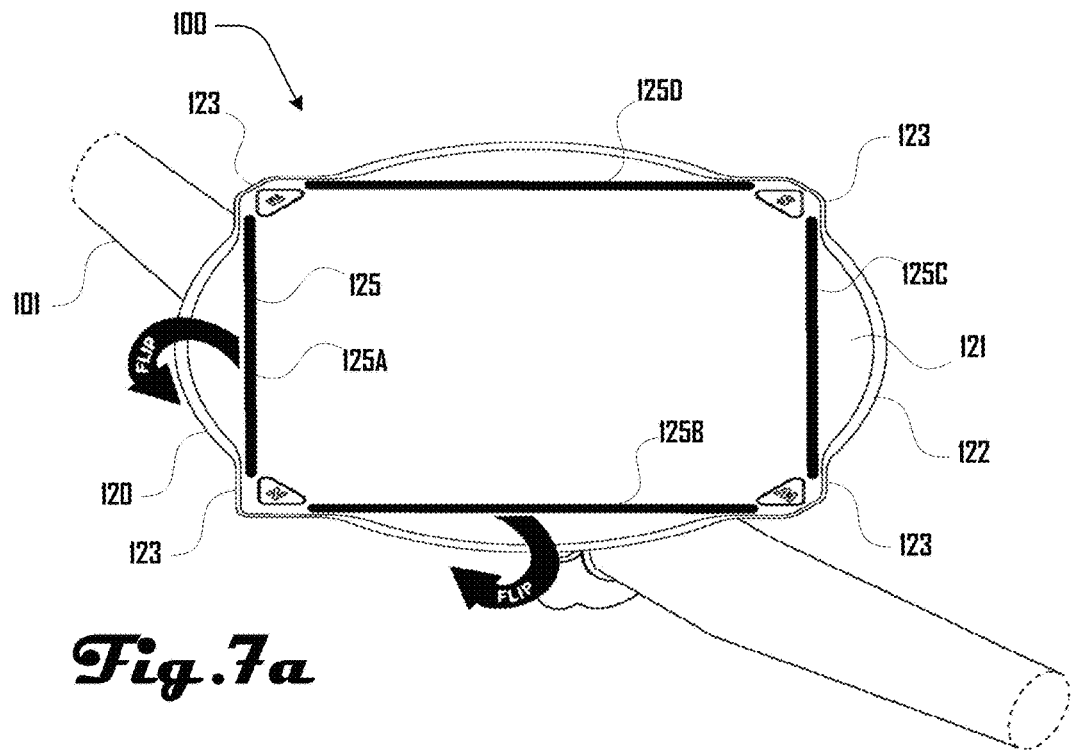
FIGS. 7a and 7b illustrate cords being flipped to the underside of the top plate.
Figure 7B:
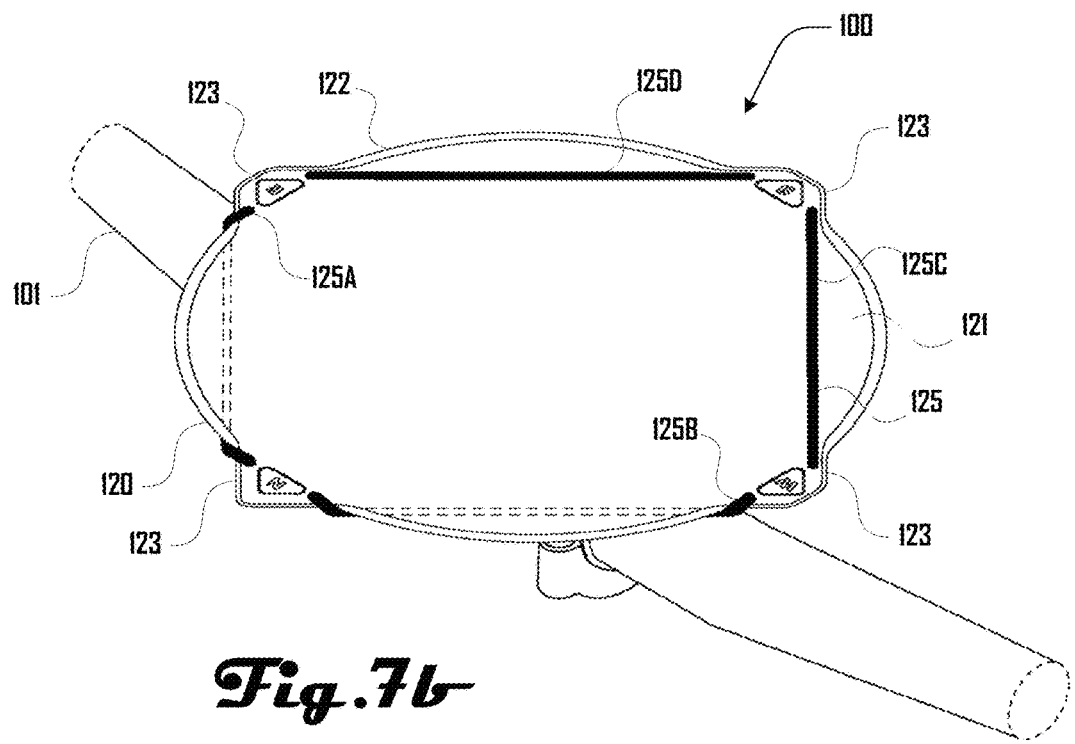
Figure 8A:
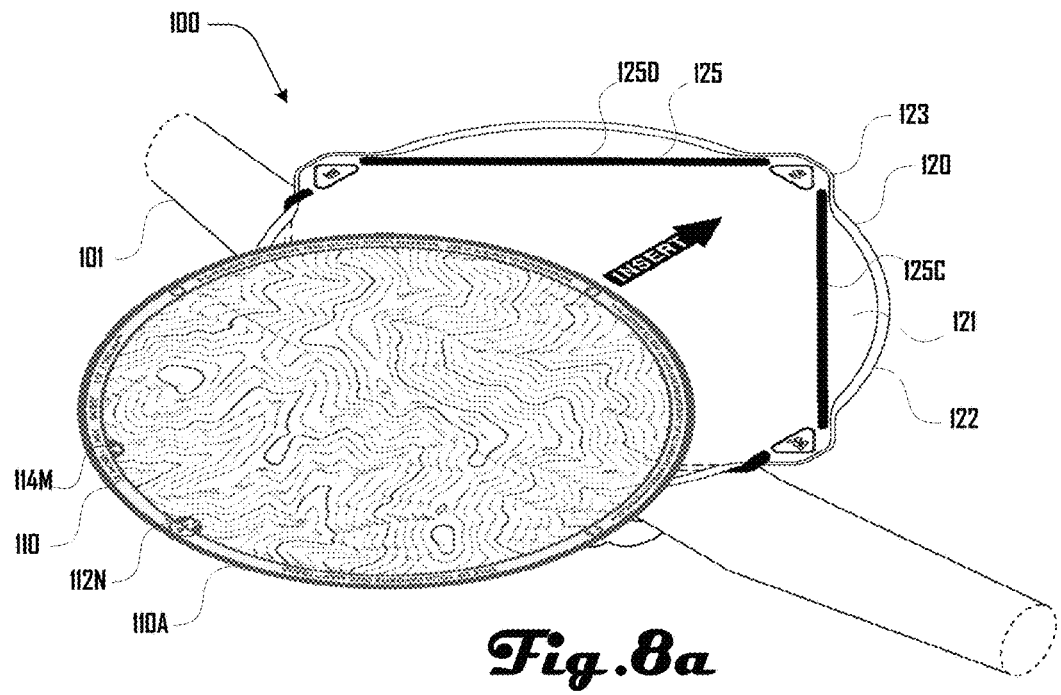
FIG. 8a illustrates a circular map inserted under cord portions with the circular map disposed on the top plate within the rim.
Figure 8B:
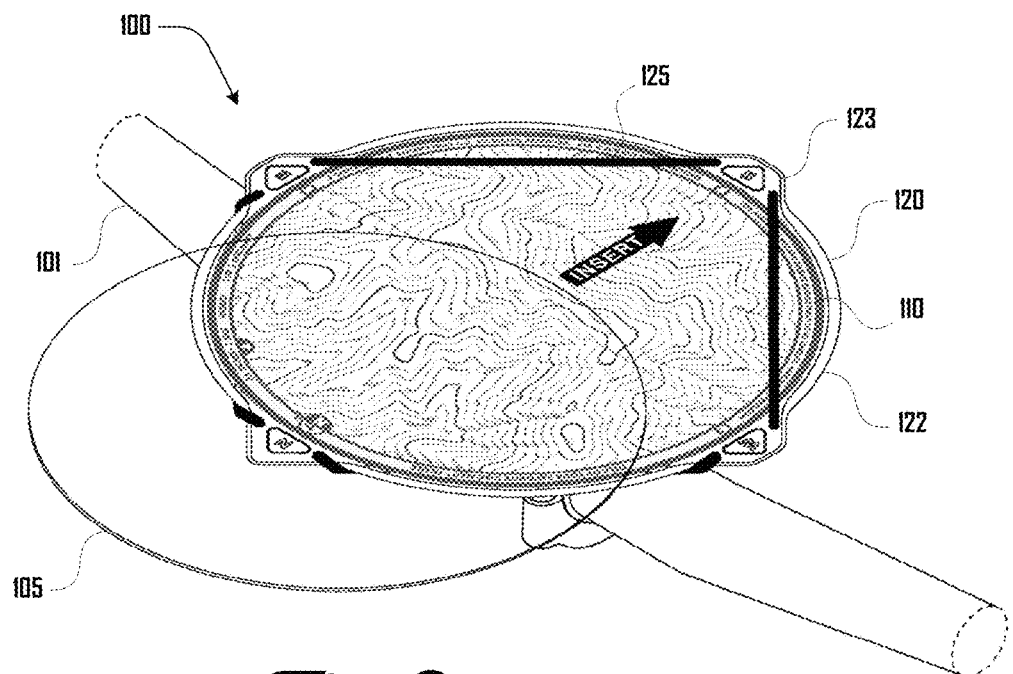
FIG. 8b illustrates a map cover inserted under cord portions over the circular map and within the rim.
Figure 9A:
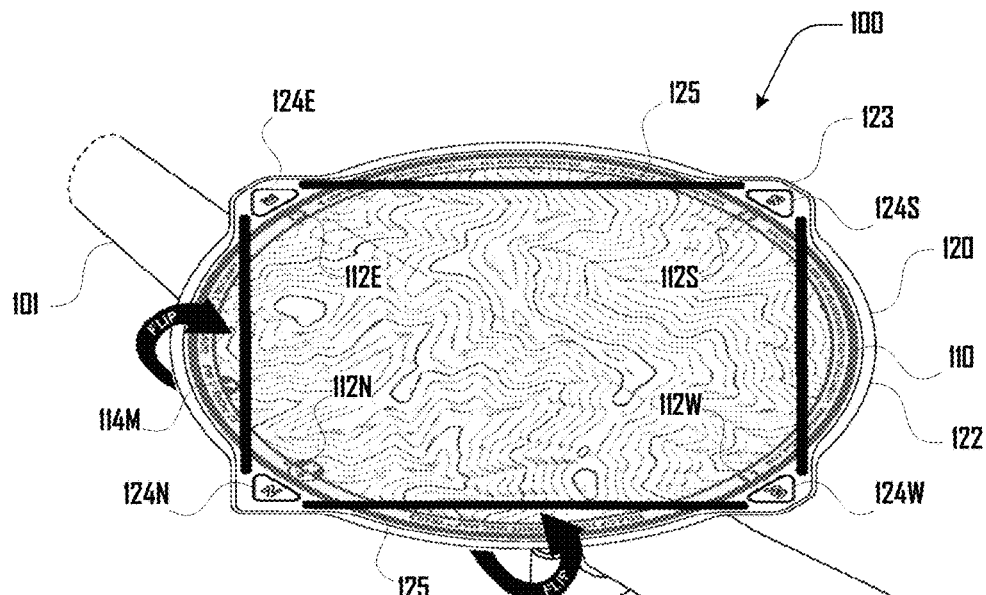
FIG. 9a illustrates cord portions being flipped to the top face of the top plate to hold the circular map and map cover on the top plate within the rim.

As discussed herein, a map 110, including a circular map 110A, can be coupled with the map holder system 100, which can be used to navigate while riding a bicycle 102. One example method of coupling a circular map 110A with the map holder system 100 is illustrated in FIGS. 7*a*, 7*b*, 8*a*, 8*b* and 9*a*. The method begins in FIG. 7*a* where a first and second cord portion 125A, 125B are flipped to the underside of the top plate 120 as shown in FIG. 7*b*. As shown in FIGS. 8*a* and 8*b*, a circular map 110A is inserted under third and fourth cord portions 125C, 125D with the circular map 110A disposed on the top plate 120 within the rim 122. As shown in FIG. 8*b*, a map cover 105 can be inserted under the third and fourth cord portions 125C, 125D over the circular map 110A and within the rim 122. As shown in FIG. 9*a*, the first and second cord portion 125A, 125B can be flipped to the top face of the top plate 120 so that the first, second, third and fourth cord portions 125A, 125B, 125C, 125C hold the circular map 110A and map cover 105 on the top plate 120 within the rim 122.

Figure 9B:
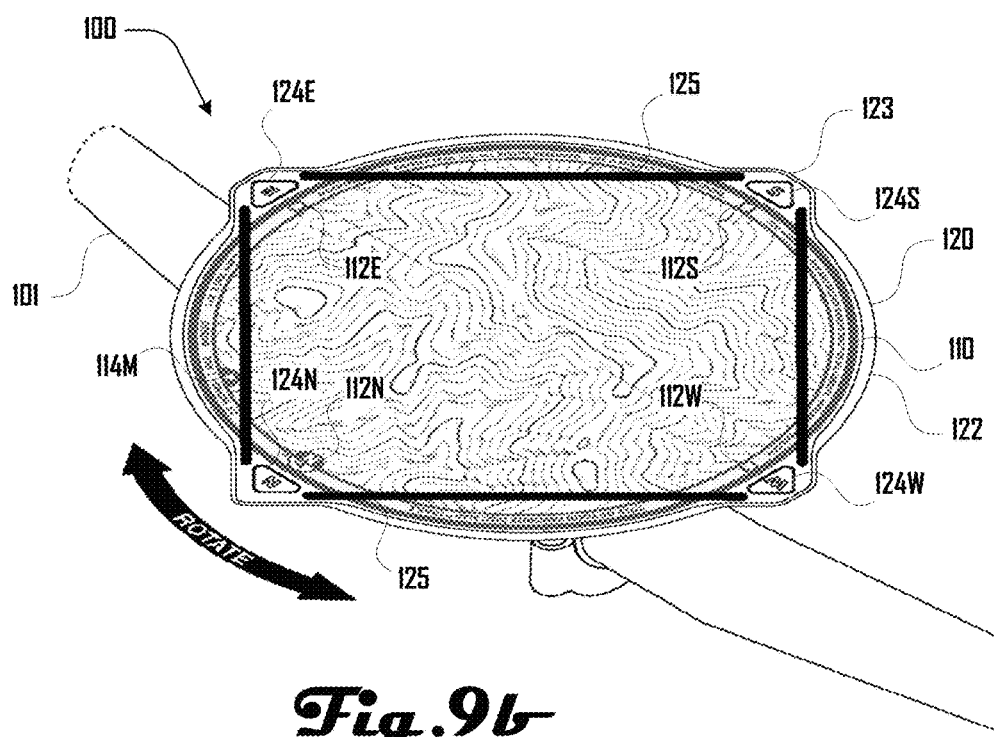
FIG. 9b illustrates rotation of the top plate.

As shown in FIGS. 8*b*, 9*a* and 9*b*, the cardinal direction indicators 112N, 112S, 112E, 112W of the circular map 110A can be positioned proximate to the respective cardinal direction indicators 124N, 124S, 124E, 124W of tabs 123 of the top plate 120. In various embodiments, such a configuration can be desirable so that a user of the bicycle 102 can use the cardinal direction indicators 124N, 124S, 124E, 124W of the top plate 120 as a guide for identifying direction on the circular map 110A and to select an orientation while riding the bicycle.

For example as shown in FIG. 9*b*, with the circular map 110A coupled to the top plate 120, a user can selectively rotate the top plate 120 to change the orientation of the circular map 110A as desired by the user. For some users, navigating with the circular map 110A while riding a bicycle 102 can be more intuitive when the orientation of the map 110A matches the direction that the user is traveling. For example, if a user is traveling generally north, it can be desirable to have the leading edge of the top plate 120 be the northern cardinal direction indicator 124N (e.g., the tab 123 having the north cardinal direction indicator 124N as shown in FIG. 9*b*) and with the orientation of the map 110 matching northern cardinal direction indicator 124N of the top plate 120 (i.e., the northern cardinal direction indicators 112N, 124N being aligned). Such a configuration is shown in FIG. 9*b*.

Following the same example, if the user then turns and begins to travel west, the user can rotate the top plate 120 to have the leading edge of the top plate 120 be the west cardinal direction indicator 124W of the top plate 120 is the leading edge of the top plate 120 and such that the map 110 is thereby also oriented with the west cardinal direction indicator 112W at the leading edge. Accordingly, as the user changes direction of travel while riding, the user can likewise rotatably change the orientation of top plate 120 to match the current direction travel.

A user can identify a direction of travel in various ways. For example, the user can use memory, the position of the sun, physical landmarks, a digital or analog compass, or the like to identify a current direction of travel. In some embodiments, a digital or analog compass can comprise a portion of the map holder system 100, or a digital or analog compass can be coupled to the bicycle 102 as a separate unit.

Figure 10A:
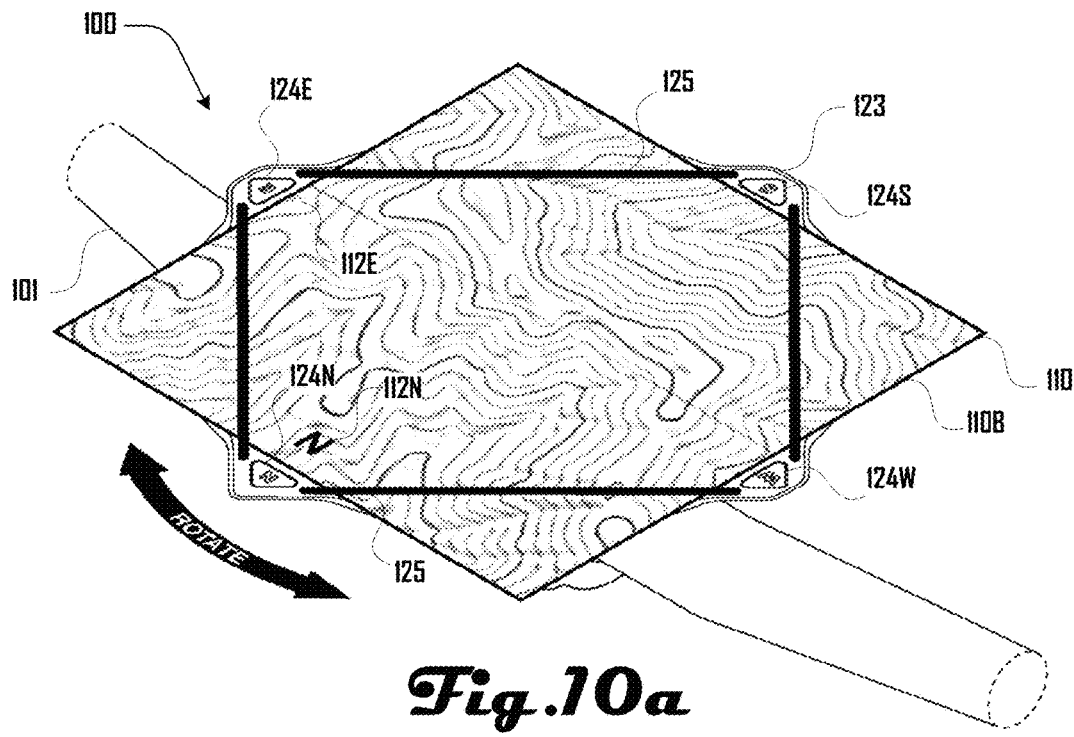
FIGS. 10a and 10b illustrate a map holder system holding a square map and a rectangular map respectively.
Figure 10B:
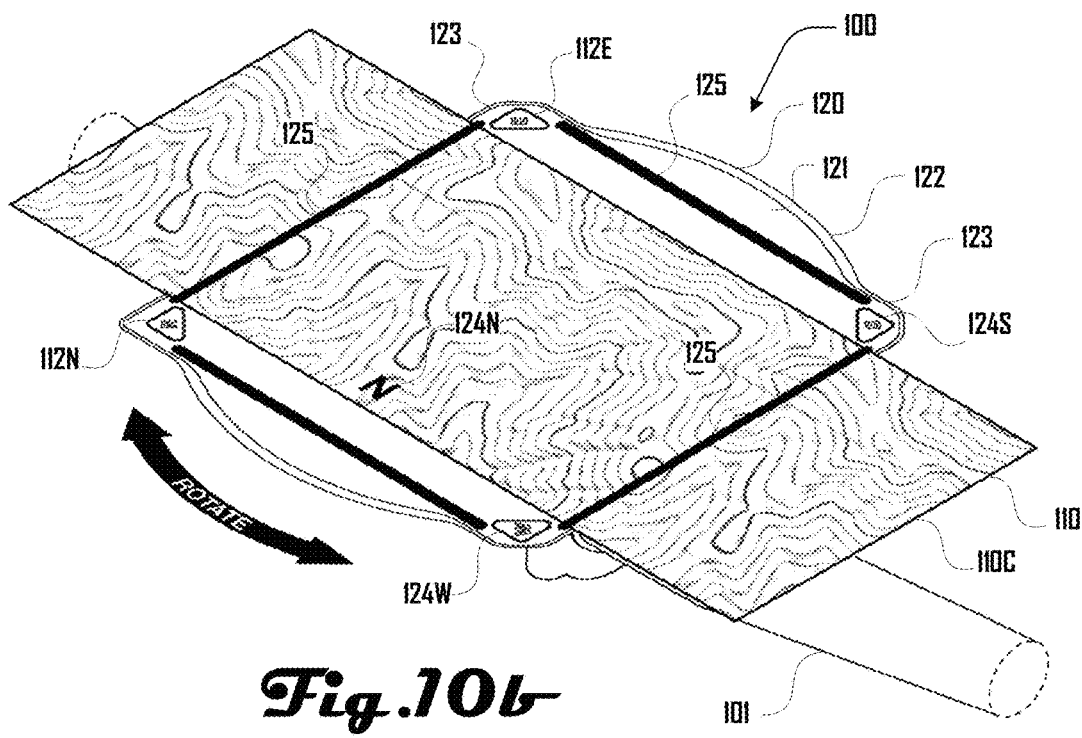

Although various examples shown herein relate to circular maps 110A, further embodiments can include maps of various suitable sizes and shapes. For example, FIGS. 10*a* and 10*b* illustrate map holder system 100 holding a square map 110B and rectangular map 110C respectively, wherein portions of the map 110 extend over the rim 122 of the top plate 120 and are held by one or more portions of the cord 125 (i.e., four portions in FIG. 10*a* and two portions in FIG. 10*b*).

Additionally, while various examples shown and described herein include a map holder system 100 coupled to handlebars 101 of a bicycle 102, this should not be construed to be limiting on the wide variety of other vehicles or non-vehicles that the map holder system 100 can be coupled to or otherwise associated with. For example, in further embodiments, the map holder system 100 can be coupled to a boat, ship, aircraft, all-terrain vehicle (ATV), golf cart, motorcycle, scooter, Segway, paraglider, parasail, or the like. Additionally, in some embodiments, the map holder system 100 can be held or coupled to a user. For example, in some embodiments, the map holder system 100 can be coupled to the wrist or arm of a user, including animal and human users.

Figure 14:
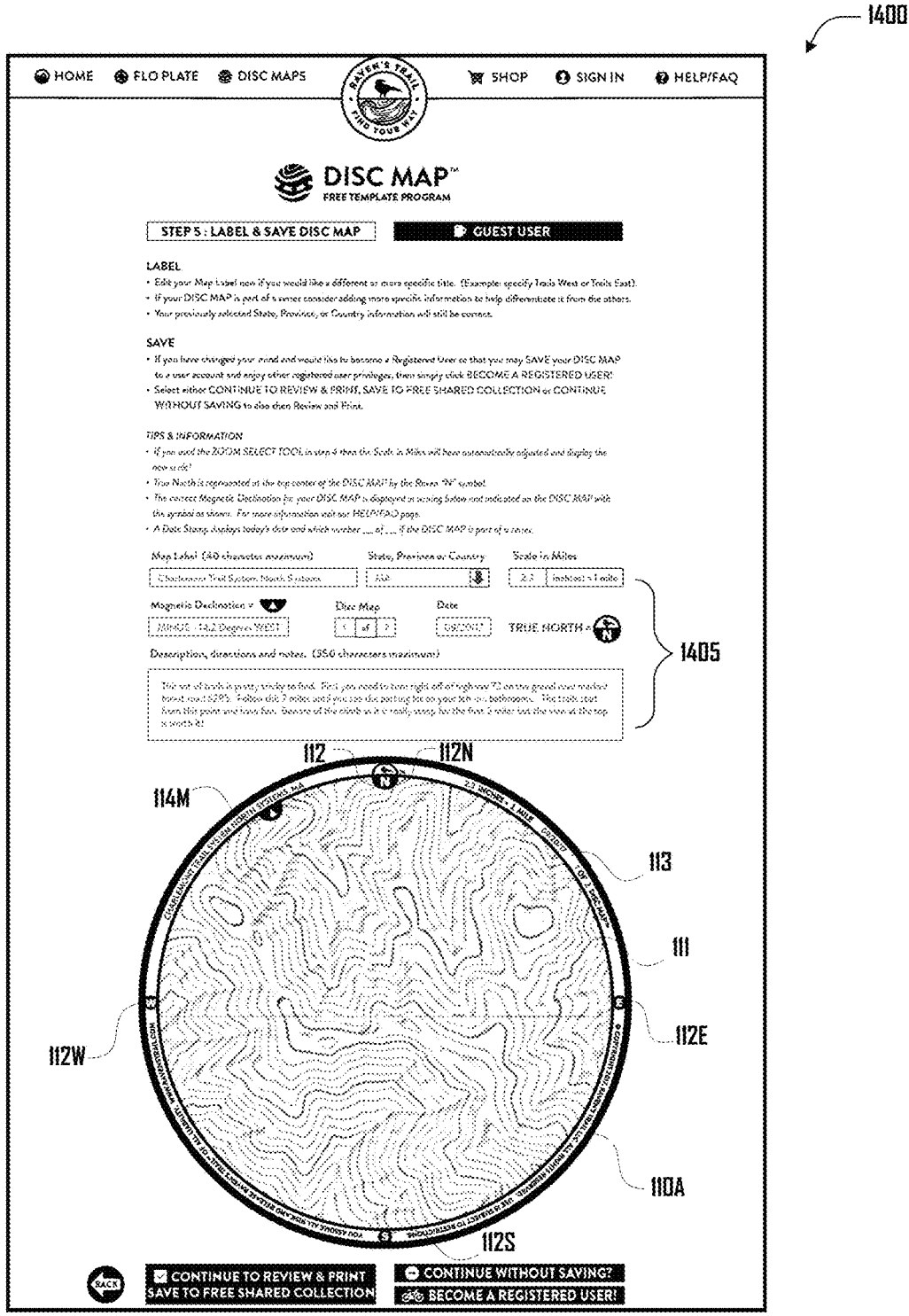
FIG. 14 illustrates a computer interface for generating a circular map in accordance with one embodiment.
Figure 15:
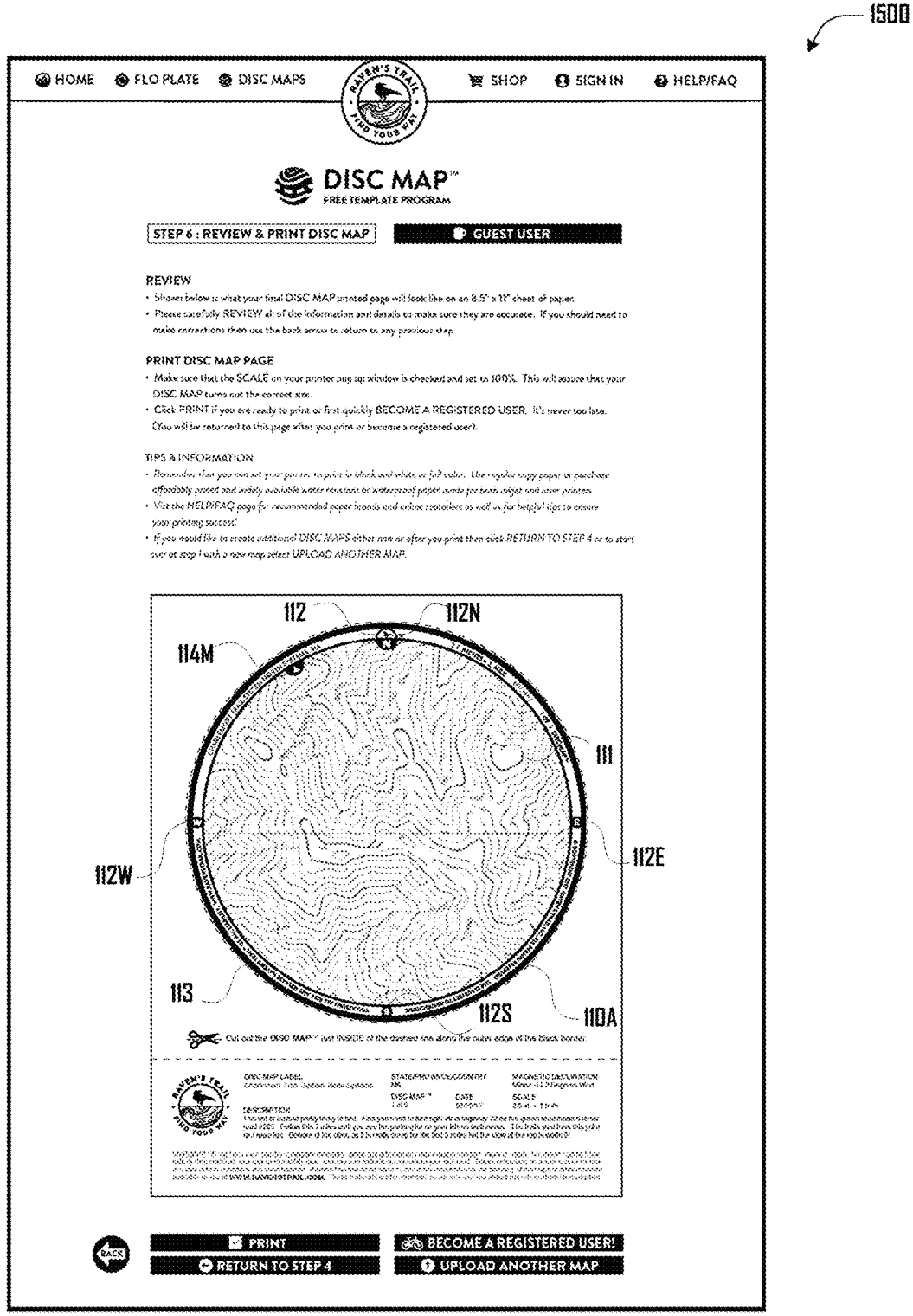
FIG. 15 illustrates a computer interface for generating a circular map in accordance with another embodiment.

Maps 110 can be generated in various suitable ways. For example, FIGS. 13*a* and 13*b* respectively illustrate two example methods 1300A, 1300B of generating a circular map 110A. The first example method 1300A begins at 1305, where a user uploads and labels a map file from a user device. For example, such a map file can include an image or other digital format that embodies an image of a map 110 of any suitable type as discussed herein. At 1310, a maps scale can be set in miles or (other suitable unit of measurement) and the map can be geo-coded (e.g., as shown in FIG. 14 via input fields 1405). At 1315, the map can be rotated to align true north in a vertical direction. At 1320, the user can zoom in or zoom out on the image of the map 110 such that a desirable portion of the image of the map 110 is shown within a circular template. At 1325, the image of a map 110 can be modified to include various suitable labels including a north, south, east and west cardinal direction indicators 112N, 112S, 112E, 112W, a magnetic north declination 114M and/or a circumference band 113 that surrounds the periphery of the circular map 110A (e.g., as shown in FIG. 15). The generated circular map 110A can be saved and/or shared. At 1330, a printable version of the generated circular map 110A can be generated for the user to review and the user can print the generated circular map 110A and cut it out (e.g., as shown in FIG. 15).

For example, a user device can include an interface that allows a user to upload a chosen map image, zoom and in and out on the image of the map 110 and move the image of the map 110 within a circular template that illustrates a portion of the map 110 that will be shown in a subsequently generated circular map 110A. The interface can also allow the user to rotate the image of the map 110 such that the image of the map 110 is oriented with a true north direction pointing toward the top of the circular template. Accordingly, the user can select a portion and orientation of the uploaded image of the map 110 that will be made into a circular map 110A.

The interface can also allow the user to input a location of the map 110, set a scale, or input other suitable information about the map 110. For example, the interface can allow the user to identify an address, coordinates, area code, zip code, city, county, state, country, or the like, associated with the uploaded image of the map 110. In some embodiments, such an identified location can be used to determine a position of magnetic north compared to true north and can be used to identify a position for the magnetic north indicator 114M, which can be added to the circular map 110A. For example, true or geodetic north is the direction along the earth's surface towards the geographic North Pole. In contrast, magnetic north is the direction a compass points toward the magnetic north pole. In some locations, magnetic north and true north can be the same direction, but the various locations, magnetic north and true north are different directions. Accordingly, information about location of a map input by a user can be used to identify the difference in direction of true north vs. magnetic north and can be used to identify a location where the magnetic north indicator 114M should be added to the circular map 110A relative to the true north indicator 112N.

Figures 13A, 13B:
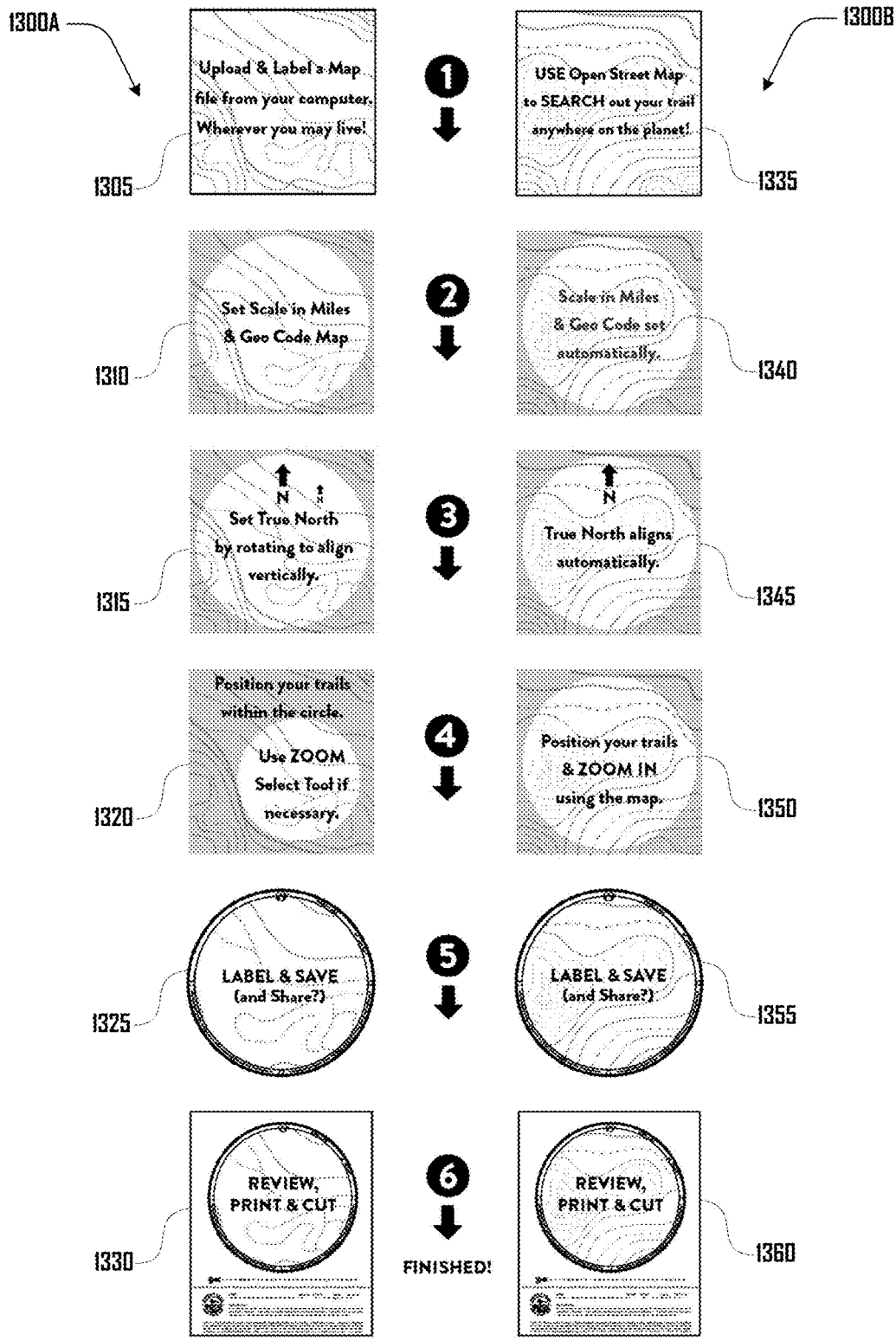
FIGS. 13a and 13b respectively illustrate two example methods of generating a circular map.

FIG. 13b illustrates an alternative example of a method 1300B of generating a circular map 110A. The method 1300B begins at 1335 where a user searches for a location via a mapping utility (e.g., Open Street Map, Google Maps, or the like). For example, the user can use the mapping utility to identify a map location, which can include functions such as zoom in, zoom out, and the like as discussed herein.

At 1340, a map scale (e.g., in miles) and a geo code can be set automatically. For example, in various embodiments a mapping utility can provide metadata associated with a map location selected by a user, which can include a map scale and a location indicator (e.g., address, coordinates, area code, zip code, city, county, state, country, or the like). However, in some embodiments, a user can input such data or override metadata provided.

At 1345, the map can be oriented automatically with true north pointing directly upward. For example, the mapping utility can automatically default to an orientation where the presented map is oriented with true north pointing upward or can be configured to change the orientation of a map such that true north is pointing upward. Alternatively, in some embodiments, a user can change the orientation of a map such that true north is pointing upward or any other suitable orientation.

At 1350, the user can further zoom in, zoom out and otherwise position the map as discussed herein, and in 1355, the user can generate a circular map 110A including a circumference band 113 and indicators 112, 114M as described herein. In various embodiments, metadata related to the map (e.g., a location indicator, compass directions, magnetic north indicator, and the like) can be used to determine the position of elements such as the indicators 112, 114M. However, in some embodiments, the user can input data to effect location placement or manually place indicators 112, 114M. The user can also save and share the generated circular map 110A. At 1360, a printable version of the generated circular map 110A can be generated for the user to review and the user can print the generated circular map 110A and cut it out.

For example, in some embodiments an interface (e.g., a website) can include, be linked with, or otherwise obtain data from a mapping utility, which can be used to generate circular maps 110 including a circumference band 113 and indicators 112, 114M. A user can select a position, zoom in, zoom out and otherwise select a desired view of a map generated by the mapping utility, which can include positioning within a circular template or mask to select an area of the map that will be visible when converted into a circular map 110A. In some embodiments, metadata associated with the map or provided by the mapping utility can be used to automatically configure a circular map 110A. For example, location, cardinal direction and magnetic direction metadata can be used to position a circumference band 113 and indicators 112, 114M.

As discussed herein, in various embodiments, an interface allows the user to upload a map image file and generate a set of one or more circular maps 110. Additionally or alternatively, an interface can use a mapping utility (e.g., OpenCycleMap.org, OpenStreetMap.org, Google Maps, and the like) to generate a set of one or more circular maps 110. Additionally, generated sets of circular maps 110 can be shared with other users. For example, a guest user can generate and anonymously share a generated set of circular maps 110. In another example, a registered user can generate and share a generated set of circular maps 110 (e.g., shared displaying a username of the registered user).

Accordingly, in various embodiments, a map server can store a plurality of circular maps 110 that can be accessed via the interface by a user that generated the circular map 110 and/or other users. For example, generated sets of circular maps 110 can be shared into a searchable catalogue. In various embodiments, a user can choose to share or not share any circular maps 110 that the user generates.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A map holder system comprising:
   a planar top plate having a circular plate face surrounded by a rim with at least four tabs disposed about the rim, the tabs including a north tab and south tab disposed along a first axis, and an east tab and a west tab disposed along a second axis that is perpendicular to the first axis;

one or more elastic cords extending between the tabs of the top plate via through-holes proximate to the tabs defined by the top plate;

a coupling plate rotatably coupled with the top plate via a plurality of clips, the coupling plate comprising a coupling architecture; and a mounting bracket removably coupled with the coupling plate, the mounting bracket configured to removably couple with handle bars a bicycle via a first and second mounting arm that define respective first and second slots, the mounting bracket including a coupling face having a plurality of coupling heads and alignment pins that are configured to engage with and removably couple with the coupling architecture of the coupling plate, the coupling face further including a locking tab configured to be movably actuated by a release lever that extends from the coupling face.

2. The map holder system of claim 1, further comprising a circular map disposed the circular plate face of the planar top plate with at least one cardinal direction indicator of the circular map aligned with one of the north tab, south tab, east tab or west tab of the planar top plate.

3. The map holder system of claim 2, wherein the circular map is coupled to the circular plate face of the planar top plate via the one or more elastic cords.

4. The map holder system of claim 3 further comprising a circular transparent map cover disposed over the circular map, the circular transparent map cover coupled over the circular map via the one or more elastic cords.

5. A map holder system comprising:
a planar top plate having a plate face surrounded by a rim with one or more tabs disposed about the rim;
a coupling plate rotatably coupled with the top plate, the coupling plate comprising a coupling architecture;
at least four tabs disposed about the rim, the tabs including a north tab and south tab disposed along a first axis, and an east tab and a west tab disposed along a second axis that is perpendicular to the first axis; and
a mounting bracket removably coupled with the coupling plate via one or more coupling heads that are configured to engage with and removably couple with the coupling architecture of the coupling plate.

6. A map holder system comprising:
a planar top plate having a plate face surrounded by a rim with one or more tabs disposed about the rim;
a coupling plate rotatably coupled with the top plate, the coupling plate comprising a coupling architecture;
one or more elastic cords extending between the tabs of the top plate via through-holes proximate to the tabs defined by the top plate; and
a mounting bracket removably coupled with the coupling plate via one or more coupling heads that are configured to engage with and removably couple with the coupling architecture of the coupling plate.

7. The map holder system of claim 5, wherein the coupling plate is rotatably coupled with the top plate via a plurality of clips.

8. The map holder system of claim 5, wherein the mounting bracket is removably coupled with handle bars of a bicycle via one or more mounting arm that define one or more coupling slots.

9. A map holder system comprising:
a planar top plate having a plate face surrounded by a rim with one or more tabs disposed about the rim;
a coupling plate rotatably coupled with the top plate, the coupling plate comprising a coupling architecture; and
a mounting bracket removably coupled with the coupling plate via one or more coupling heads that are configured to engage with and removably couple with the coupling architecture of the coupling plate, wherein the mounting bracket further includes a locking tab configured to be movably actuated by a release lever that extends from the a coupling face of the mounting bracket.

10. A map holder system comprising:
a planar top plate having a plate face surrounded by a rim with one or more tabs disposed about the rim;
a coupling plate rotatably coupled with the top plate, the coupling plate comprising a coupling architecture;
a circular map disposed on the plate face of the planar top plate with at least one cardinal direction indicator of the circular map aligned with the one or more tab of the planar top plate; and
a mounting bracket removably coupled with the coupling plate via one or more coupling heads that are configured to engage with and removably couple with the coupling architecture of the coupling plate.

11. The map holder system of claim 10, wherein the circular map is coupled to the plate face of the planar top plate via one or more elastic cords.

12. The map holder system of claim 11 further comprising a circular transparent map cover disposed over the circular map, the circular transparent map cover coupled over the circular map via the one or more elastic cords.

13. The map holder system of claim 5, wherein the plate face of the planar top plate is circular.

* * * * *